May 11, 1954   S. S. TUCKER   2,678,220
RELEASABLE STANDARD ASSEMBLY FOR VEHICLE BOLSTERS
Filed March 20, 1951   2 Sheets-Sheet 1
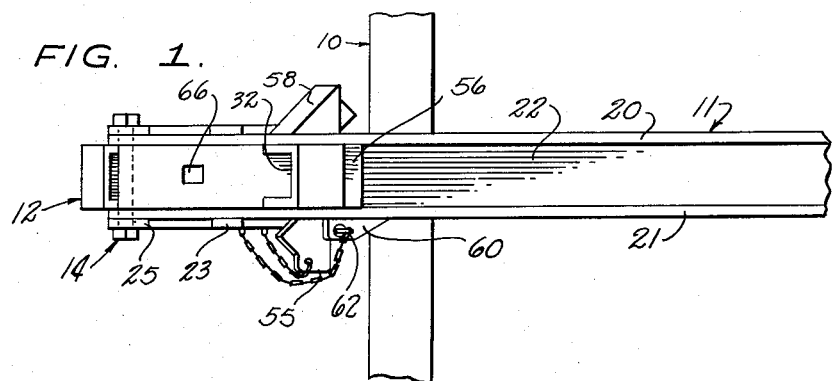
FIG. 1.
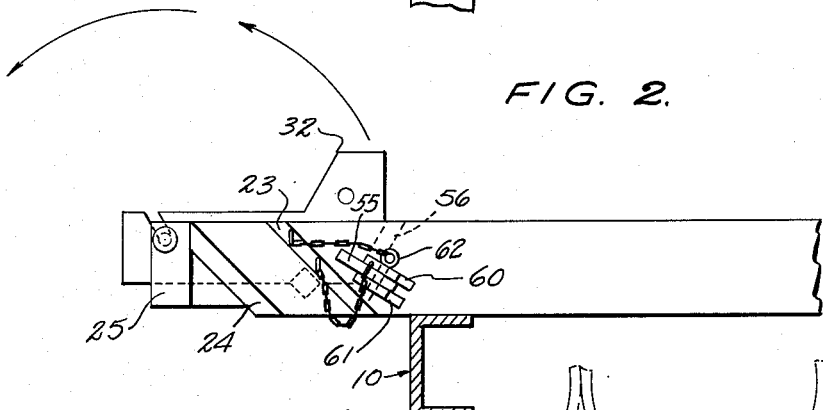
FIG. 2.
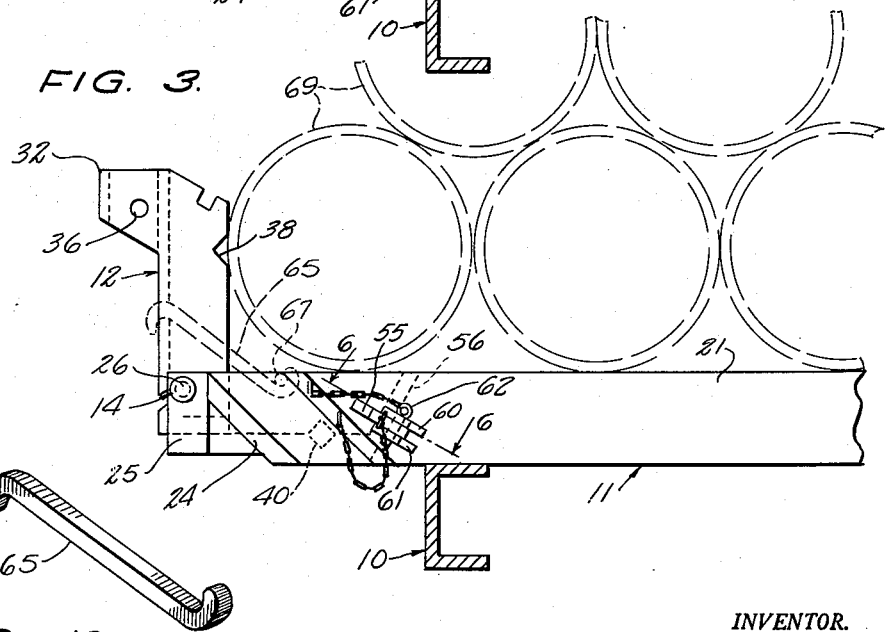
FIG. 3.
FIG. 10.
INVENTOR.
SHIRLEY S. TUCKER,
BY
McMorrow, Berman + Davidson
ATTORNEYS.

May 11, 1954 S. S. TUCKER 2,678,220
RELEASABLE STANDARD ASSEMBLY FOR VEHICLE BOLSTERS
Filed March 20, 1951 2 Sheets-Sheet 2
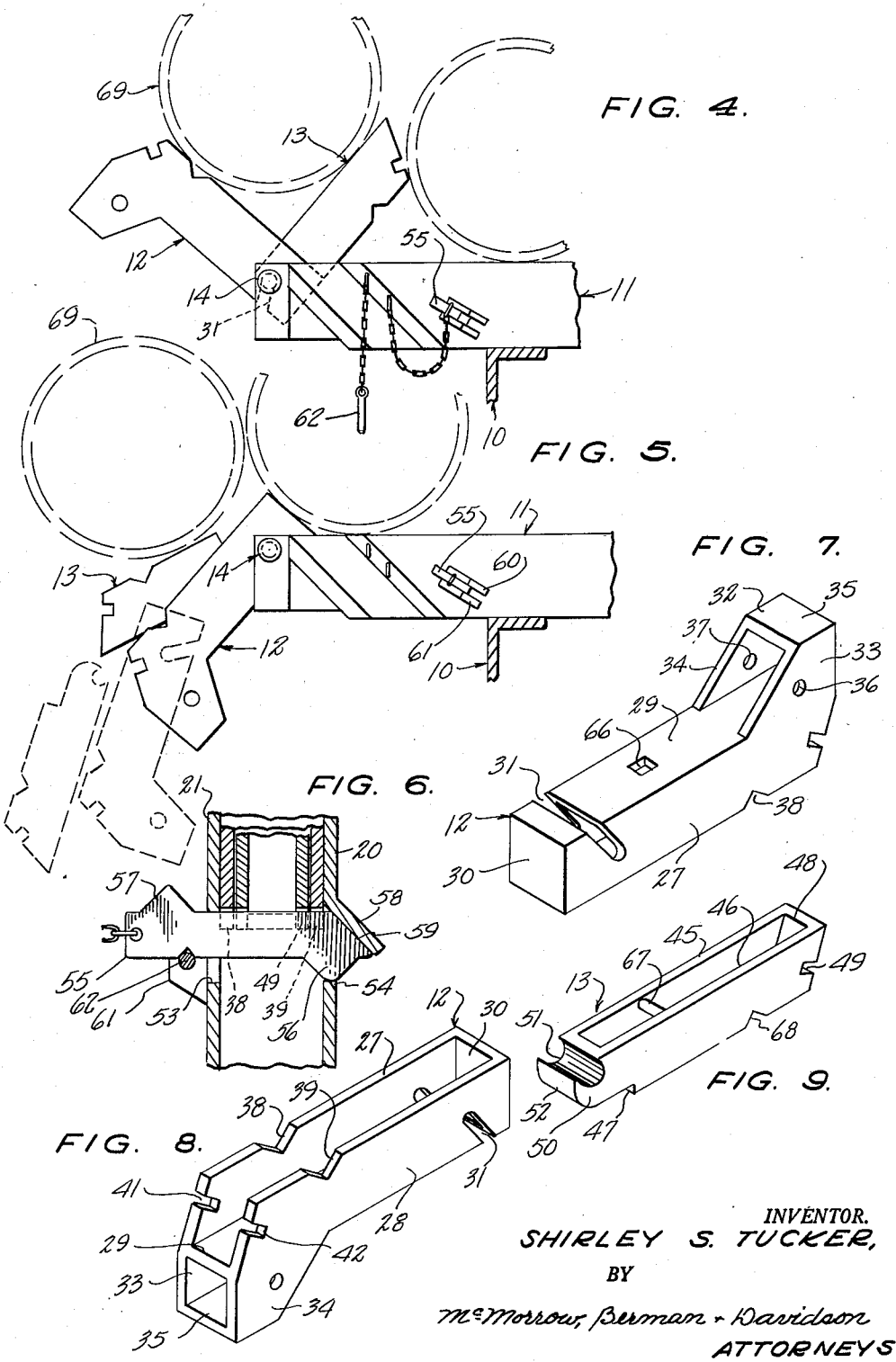
INVENTOR.
SHIRLEY S. TUCKER,
BY
McMorrow, Berman + Davidson
ATTORNEYS.

Patented May 11, 1954

2,678,220

UNITED STATES PATENT OFFICE 2,678,220

RELEASABLE STANDARD ASSEMBLY FOR VEHICLE BOLSTERS

Shirley S. Tucker, Memphis, Tenn.

Application March 20, 1951, Serial No. 216,554

3 Claims. (Cl. 280—145)

This invention relates to beam or bolster and stake assemblies for retaining loads of generally cylindrical objects, such as logs, poles, tube or pipe sections, tanks and drums, in place on vehicles, such as trucks, trailers and railway cars, and more particularly to an assembly including pivotally mounted standards which can be swung to positions substantially below the associated beams or bolsters while a vehicle is being loaded or unloaded, and locked in erect position for retaining a load on a vehicle.

It is among the objects of the invention to provide an improved assembly of the character indicated above which provides load supporting bolsters, or equivalent beams in the case of railway cars, and standards pivotally mounted on opposite ends of each bolster, which are releasably lockable in upright load retaining positions and can be released to swing to their load releasing positions by a person working at a location entirely clear of the load being released; in which the standards are positively locked in upright position against accidental release but are easily released manually for movement to their unloading positions and can also be positively locked in retracted position for movement of the vehicle in an empty condition; in which the standards are detachably secured to the associated bolsters so that standards of different heights can be used to satisfy the requirements of different load conditions and wherein the standards are equipped to carry extensions; which can be installed on various types of existing vehicles; and which assembly is simple, strong and durable in construction, economical to manufacture and install, and positive and effective in operation.

Other objects and advantages will become apparent from a consideration of the following description and the appended claims in conjunction with the accompanying drawings wherein:

Figure 1 is a top plan view of a fragmentary portion of a bolster and log stake assembly illustrative of the invention;

Figure 2 is a side elevational view of the assembly illustrated in Figure 1 showing the movable parts in retracted position;

Figure 3 is a side elevational view similar to Figure 2, but showing the movable parts in extended or operative position;

Figure 4 is a fragmentary side elevational view showing the parts in a different operative position from that illustrated in Figures 2 and 3;

Figure 5 is a fragmentary side elevational view similar to Figures 2, 3 and 4, but showing the parts in a still different operative position;

Figure 6 is a fragmentary cross sectional view on an enlarged scale on the line 6—6 of Figure 3;

Figure 7 is a perspective view of a standard constituting an operative component of the assembly;

Figure 8 is a perspective view of the standard illustrated in Figure 7, but showing the standard inverted and turned end for end from its position illustrated in Figure 7;

Figure 9 is a perspective view of a clip block or trip associated with the standard illustrated in Figures 7 and 8; and Figure 10 is a perspective view of a reinforcing hook used to support the parts in the operative positions illustrated in Figure 3.

With continued reference to the drawings, the numeral 10 generally designates a frame side member of a truck or trailer upon which a load retaining assembly in accordance with the present invention is shown mounted.

In the arrangement illustrated, the assembly is shown as applied to bolsters extending transversely of a vehicle frame near respectively opposite ends of the frame, but it is to be understood that it may be applied with equal facility to structures, such as beam structures extending longitudinally of railroad cars or similar vehicles. While, as stated above, the assemblies will normally be disposed one near each end of a vehicle frame, additional assemblies may be disposed between the end assemblies, if desired, without in any way exceeding the scope of the invention.

As the several assemblies mounted on a vehicle are all similar in construction and arrangement, a detailed illustration and description of one assembly is considered sufficient for the purposes of the present disclosure.

In the arrangement illustrated, the assembly comprises, in general, a bolster 11, a standard 12, disposed at one end of the bolster, a trip or foot block 13 having one end received in one end of the standard 12, a pivot pin 14 extending through registering apertures in the bolster, the standard and the foot block, and pivotally interconnecting these elements, a locking bar 55 extending transversely through the bolster and being engageable with the standard and with the foot block to hold them in predetermined positions, and a locking pin 62 for the locking bar 55.

The bolster 11 comprises a pair of side plates 20 and 21 disposed in spaced apart and substantially parallel relationship and positioned substantially perpendicular to the frame side member 10 in both vertical and horizontal directions, and a web structure 22 disposed between the side plates 20 and 21 and secured along its edges to the side plates to maintain the latter in predetermined position relative to each other. The web structure terminates adjacent the outer side of the frame side member 10 and outwardly of the frame side member the bolster is provided with external reinforcing elements, as indicated at 23, 24 and 25. At its outer end and near its upper edge the bolster is provided with registering apertures which receive the pivot pin 14 which extends transversely of the bolster with its axis substantially perpendicular to the planes of the side plates 20 and 21.

The standard 12 comprises a box-like structure of elongated, rectangular shape and substantially square cross sectional shape having spaced apart and substantially parallel side walls 27 and 28, a top wall 29 and a bottom wall 30, the bottom side and the outer end of the standard being open, as is clearly illustrated in Figure 8.

Near the bottom wall 30 the standard is provided with a transversely extending notch 31 which extends through the top wall 29 and through the sidewalls 27 and 28 and is inclined away from the inner end of the standard. This notch 31 receives the pivot pin 14 to pivotally connect the standard 12 to the bolster 11 at the corresponding end of the latter.

At its outer end the standard is provided with a hollow bracket 32 which projects outwardly from the top wall 29 and includes side walls 33 and 34 extending outwardly from the side walls 27 and 28 in alignment with the latter and a top wall 35 spaced outwardly from and substantially parallel to the front wall 29 of the standard. This bracket provides a rectangular socket for the reception of the lower end of a standard extension and the side walls 33 and 34 are provided with mutually registering apertures 36 and 37 to receive a pin for securing an extension in the bracket 32.

The width of the standard 12 is substantially equal to the distance between the inner surfaces of the side walls 20 and 21 of the bolster and the standard is preferably formed of plate metal of suitable thickness to provide the required strength and rigidity.

The side walls 27 and 28 of the standard are provided intermediate their length and in their edges remote from the front wall 29 with registering notches 38 and 39 of right angular triangle shape and a bar 40 of square cross sectional shape extends between the side bars of the bolster at a distance from the pivot pin 26 substantially equal to the distance from the inner end of the notch 31 to the notches 38 and 39 in the standard. This bar is positioned near the lower edges of the side plates of the bolster and has one edge directed upwardly, the upper portion of this bar being received in the notches 38 and 39 when the standard is received in retracted position between the side plates of the bolster and providing a stop for movement of the standard in the retracting position.

The top edges of the side walls 27 and 28 of the standard are inclined downwardly in a direction away from the front wall 29 and are provided with registering notches 41 and 42 of rectangular shape for a purpose which will be later explained.

The trip or foot block 13 is also a box-like structure formed of metal plate of suitable thickness and includes spaced apart and substantially parallel side walls 45 and 46, a front wall 47 and an end wall 48 at one end. The side of the foot block opposite the front wall 47 is left open and the end wall 48 is inclined relative to the edges of the side walls and this end of the foot block is provided with a transversely extending notch 49 of rectangular cross sectional shape, the purpose of which will also be later explained.

The foot block 13 has a width substantially equal to the distance between the inner surfaces of the side plates 27 and 28 of the standard 12 and has on its end opposite the end wall 48 a lug formation 50 which is receivable in the standard 12 adjacent the bottom wall 30 of the standard. This lug formation has in its side adjacent the open side of the foot block a partly cylindrical recess 51 which extends transversely of the foot block and receives the pivot pin 14, as illustrated in Figure 4. The side of the lug formation 50 opposite the recess 51 is flat and, when the pivot pin 14 is received in the recess 51 the flat bottom surface of the formation bears on the inner side of the bottom wall 30 of the post and positively holds the post and the foot plate at right angles to each other. The distal end of the lug formation 50 is transversely curved however, as illustrated at 52, so that the foot block can be swung about the pivot pin from its position perpendicular to the standard 12 to a position in which it is substantially received in the interior of the standard between the side walls 27 and 28 of the latter, as shown in Figure 2.

In mounting the standard and the foot block or trip on the bolster, the end of the standard having the bottom wall 30 is disposed between the side plates of the bolster adjacent the pivot pin 40 with the front wall of the standard facing the end of the bolster and the pivot pin is then inserted into the notch or recess 31 of the standard. The lug formation 50 on the foot block is then inserted into the end of the standard adjacent the bottom wall 30 and moved until the pivot pin is received in the recess 51 of this lug formation. The standard and front foot block are now both operatively mounted on the bolster by the pivot pin 14.

If it is now desired to hold the standard in erect or upright position substantially perpendicular to the bolster 11, the foot block 13 is disposed substantially perpendicular to the standard and is moved to a position in which it is received between the side plates of the bolster. The side plates of the bolster are provided with registering rectangular apertures or slots 53 and 54 slidably receiving a locking bar 55 of rectangular cross sectional shape. Adjacent the slots 53 and 54 an inclined plate 56 is disposed between the side plates of the bolster and is provided with a slot receiving the locking bar 55. This plate is so positioned in the bolster that when the foot block 13 is moved to the position in which it is disposed within the bolster between the side plates of the latter, the end wall 48 of the foot block bears against the adjacent side of the inclined plate 56 so that the inclined plate provides a stop for this retracting movement of the foot block and holds the foot block in position such that the notch 49 in the end of the foot block registers with the slots 53 and 54 in the side plates of the bolster.

The locking bar 55 is provided with triangular extensions 56 and 57 projecting from the opposite longitudinal edges thereof and disposed one near each end of the bar and the side plate 20 of the bolster is provided with an outwardly inclined tongue 58 overlying the slot 54 and bearing against the inclined end 59 of the locking bar.

Apertured lugs 60 and 61 project outwardly from the side plate 21 adjacent the slot 53 and at respectively opposite sides of the bar 55 and a locking pin 62 is received in the apertures of these lugs.

When the locking bar is in operative position to lock the foot block 13 to the bolster, as illustrated in Figure 6, the apex of the extension 56 bears against the end of the block 54 remote from the foot block and the pin 62 is partly received in a notch in the longitudinal edge of the locking bar remote from the foot block. With the locking bar thus engaged in the notch 49 in the foot block and the lug formation of the foot block received in the bottom end of the standard 12 and engaged with the pivot pin 14, the standard will be rigidly held in upright position substantially perpendicular to the bolster 11, as is particularly illustrated in Figure 3. This is the load retaining position of the standard.

The standard 12 may be reinforced in its upright position, as illustrated in Figure 3, by extending the double ended hook 65, particularly illustrated in Figure 10, through an aperture 66 in the front wall 29 of the standard and engaging the recurved formation at one end of the hook with the pin 67 which extends transversely of the foot block 13 intermediate the length of the foot block. The other end of the hook then engages the front wall 29 of the standard and reinforces the connection between the standard and the foot block to hold these members perpendicular to each other.

It will be noted that the foot block is also provided with V-shaped notches 68 which receive the upper portion of the bar 40 when the foot block is disposed within the bolster, as explained above.

The construction at each end of each bolster is the same as that described above, and with all of the standards held in upright position substantially perpendicular to the corresponding bolsters, a load, such as the load of tube sections 69, is retained on the vehicle by the standards.

When it is desired to discharge the load from the vehicle, the hooks 65 are first removed from the standards at the sides of the vehicle at which it is desired to discharge the load. Next, the safety locking pins 62 are removed from the corresponding lugs from positions at the ends of the vehicle and entirely clear of the load discharge side of the vehicle. After the safety locking pins have been removed, the slide bars 55 are driven inwardly from the outer ends of the vehicle and and as each locking bar is driven inwardly the tongue 58 on the corresponding bolster forces the inner end of the locking bar away from the associated foot block and the projection 57 on the locking bar engaging the adjacent end of the corresponding slot in the bolster forces the outer end of the bar away from the foot block until the locking bar is forced entirely out of the notch 49 in the foot block. The foot block and the standard then rock about the pivot pin 14 from the position shown in Figure 3 to that shown in Figure 4 and, as the first tube section descends from the vehicle, from the position illustrated in Figure 4, to that illustrated in Figure 5, in which the foot block or trip has been folded over into the standard and the standard is inclined outwardly and downwardly from the pivot pin 14. From the position illustrated in Figure 5 the standard and foot block may drop entirely free of the bolster because of the formation of the slot 31 opening to the front side of the standard. If desired, this slot may be provided merely as a pair of registering apertures in the side walls of the standard receiving the pin 14, in which case the standard will remain pivotally connected to the bolster at the corresponding end of the latter.

In driving the locking bars 55 inwardly from the opposite ends of the vehicle to release the load, the operator is entirely clear of the descending load and in no danger of being injured by the articles constituting the load as such articles roll off of the vehicle. This is a material advantage of the present arrangement over the arrangements now in use for retaining a load of generally cylindrical objects on a vehicle and releasing the load at an unloading location.

After the load has descended from the vehicle, the standards and associated trips or foot blocks are reassembled with the bolsters, engaging the pivot pins 14 in the manner indicated above and the foot blocks are folded into the standards and the standards and foot blocks together are folded into the bolsters to the retracted position particularly illustrated in Figure 2. With the standards and foot blocks in this retracted position, the corresponding slide bars are pulled outwardly of the bolsters until the slide bars engage in the notches 38 and 39 of the corresponding standards and in the notch 49 of the corresponding foot block, whereupon the safety locking pins 62 are inserted into the corresponding lugs to lock the lock bars in position. The vehicle may now be moved empty to a loading area to receive a new load and, at the loading area the lock bars at one side of the vehicle will be moved to release the corresponding standards and foot blocks. The standards may now be inclined outwardly and downwardly from the corresponding ends of the bolsters with the associated foot block extending upwardly and the first layer of objects constituting the load move over the standards and foot blocks at the loading side of the vehicle.

When the last object constituting the first layer of the load is in place, it will rest upon the foot blocks at the corresponding side of the vehicle and force the associated standards upwardly to their upright, load retaining position. The lock bars 55 are now pulled outwardly to engage the associated foot blocks and the hook 65 may be installed, if desired.

The load may now be completed over the upper ends of the upright standards, standard extensions being added to the tops of the standards, if desired, and after the load has been completed and moved to the unloading area the load is discharged in the manner fully described above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a load retaining assembly for a vehicle, a bolster comprising a pair of laterally spaced sideplates and a web extending between the sideplates, a pivot pin extending across the bolster between and extending through said sideplates, a hollow standard positioned between said sideplates, said standard having spaced sidewalls and having one end thereof pivotally engaged with said pivot pin, said standard having a wall extending between and connected to its sidewalls at said one end of the standard, a foot block positioned between the said sidewalls of the standard, said foot block having one end pivotally engaged with said pivot pin and having a transverse pin fixed to the foot block, said standard and said foot block being pivotable relative to each other on said pivot pin from a first position in which said standard and said foot block are horizontal and are nested together between the sideplates of the bolster to a second position in which the standard and the foot block are at right angles to each other with the standard erect and projecting upwardly from the bolster, first locking means removably engageable with a portion of said standard and with said pin on the footblock and serving to prevent said standard from swinging away from said foot block, and second locking means removably engageable with said bolster and with said foot block and serving to prevent said foot block from moving out of said second position, said second means comprising a portion engaging said wall of the standard in said second position whereby said standard is prevented from swinging from erect position toward said foot block.

2. In a load retaining assembly for a vehicle, a bolster comprising a pair of laterally spaced sideplates and a web extending between the sideplates, a pivot pin extending across the bolster between and extending through said sideplates, a hollow standard positioned between said sideplates, said standard having spaced sidewalls and having one end thereof pivotally engaged with said pivot pin, said standard having a wall extending between and connected to its sidewalls at said one end of the standard, a foot block positioned between the said sidewalls of the standard, said foot block having one end pivotally engaged with said pivot pin and having a transverse pin fixed to the foot block, said standard and said foot block being pivotable relative to each other on said pivot pin from a first position in which said standard and said foot block are horizontal and are nested together between the sideplates of the bolster to a second position in which the standard and the foot block are at right angles to each other with the standard erect and projecting upwardly from the bolster, first locking means removably engageable with a portion of said standard and with said pin on the footblock and serving to prevent said standard from swinging away from said foot block, and second locking means removably engageable with said bolster and with said foot block and serving to prevent said foot block from moving out of said second position, said second means comprising a portion engaging said wall of the standard in said second position whereby said standard is prevented from swinging from erect position toward said foot block, said second locking means comprising a bar horizontally slidable across the bolster through openings formed in the bolster sideplates.

3. In a load retaining assembly for a vehicle, a bolster comprising a pair of laterally spaced sideplates and a web extending between the sideplates, a pivot pin extending across the bolster between and extending through said sideplates, a hollow standard positioned between said sideplates, said standard having spaced sidewalls and having one end thereof pivotally engaged with said pivot pin, said standard having a wall extending between and connected to its sidewalls at said one end of the standard, a foot block positioned between the said sidewalls of the standard, said foot block having one end pivotally engaged with said pivot pin and having a transverse pin fixed to the foot block, said standard and said foot block being pivotable relative to each other on said pivot pin from a first position in which said standard and said foot block are horizontal and are nested together between the sideplates of the bolster to a second position in which the standard and the foot block are at right angles to each other with the standard erect and projecting upwardly from the bolster, first locking means removably engageable with a portion of said standard and with said pin on the footblock and serving to prevent said standard from swinging away from said foot block, and second locking means removably engageable with said bolster and with said foot block and serving to prevent said foot block from moving out of said second position, said second means comprising a portion engaging said wall of the standard in said second position whereby said standard is prevented from swinging from erect position toward said foot block, said second locking means comprising a bar horizontally slidable across the bolster through openings formed in the bolster sideplates, and a locking pin engaged in portions on one of said bolster sideplates and engageable with said bar to hold the bar in locking engagement with said foot block.

References Cited in the file of this patent

UNITED STATES PATENTS

| Number | Name | Date |
| --- | --- | --- |
| 705,200 | Bradley et al. | July 22, 1902 |
| 711,434 | Mock | Oct. 14, 1902 |
| 1,157,584 | Rose | Oct. 19, 1915 |
| 2,114,707 | Fitch et al. | Apr. 19, 1938 |
| 2,256,623 | Newman, Sr. | Sept. 23, 1941 |